Nov. 30, 1943.  P. S. DICKEY  2,335,655
CONTROL SYSTEM
Original Filed Dec. 18, 1935   3 Sheets-Sheet 1
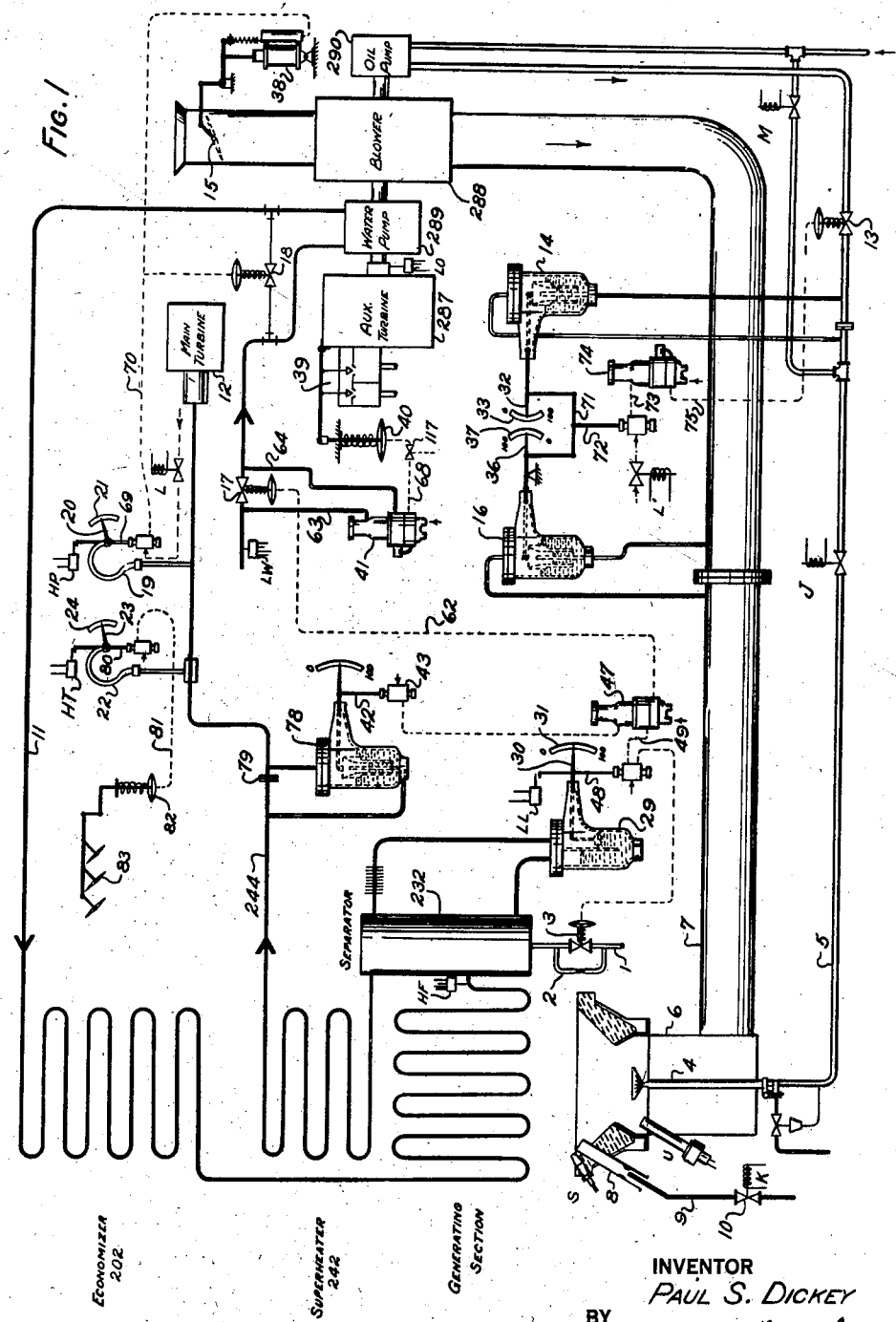
INVENTOR
PAUL S. DICKEY
BY
Raymond W. Jimkins
ATTORNEY Nov. 30, 1943.        P. S. DICKEY        2,335,655
CONTROL SYSTEM
Original Filed Dec. 18, 1935        3 Sheets-Sheet 2
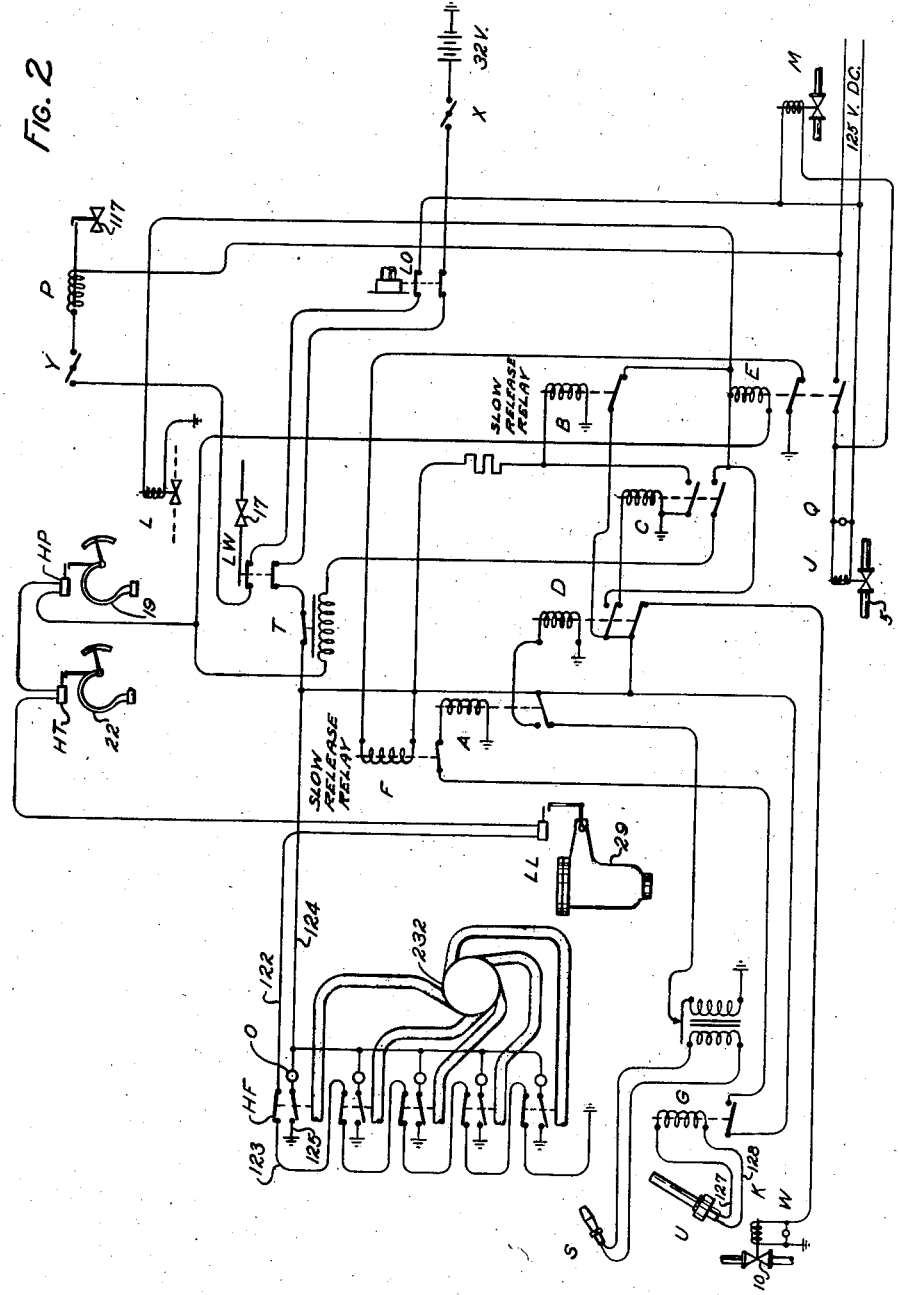
INVENTOR
PAUL S. DICKEY
BY
ATTORNEY Nov. 30, 1943.   P. S. DICKEY   2,335,655
CONTROL SYSTEM
Original Filed Dec. 18, 1935    3 Sheets-Sheet 3

INVENTOR
PAUL S. DICKEY
BY
Raymond D. Jenkins
ATTORNEY

Patented Nov. 30, 1943

2,335,655

UNITED STATES PATENT OFFICE 2,335,655

CONTROL SYSTEM

Paul S. Dickey, Cleveland, Ohio, assignor to Bailey Meter Company, a corporation of Delaware Original application December 18, 1935, Serial No. 55,023. Divided and this application May 5, 1938, Serial No. 206,304

5 Claims. (Cl. 158—28)

This invention relates to a method and means for operating and controlling the operation of vapor generators; particularly vapor generators of the drumless, forced flow type, having a fluid flow path including one or more long small-bore tubes, in which the flow in the path is initiated by the entrance of liquid under pressure at one end, and the exit of vapor only at the other end; characterized by an inflow of liquid normally greater than the outflow of vapor, the difference being diverted from the path intermediate the ends thereof, as disclosed and claimed in my parent Patent 2,170,346, issued August 22, 1939, of which this application is a division.

The principal object of this invention relates to a kindling and igniting control system for this type of vapor generator.

Still another object is to provide a sequence and protective system for maximum safety of operation.

Further objects will become evident from a study of the specification and of the drawings, in which:

Fig. 1 diagrammatically illustrates a drumless forced flow vapor generator, combined with the requisite apparatus to control the functioning thereof, and such apparatus shown in partially diagrammatic fashion.

Fig. 2 is a wiring diagram related particularly to the layout of Fig. 1.

In the various drawings, identical parts bear the same reference numerals.

Figures 3, 4:
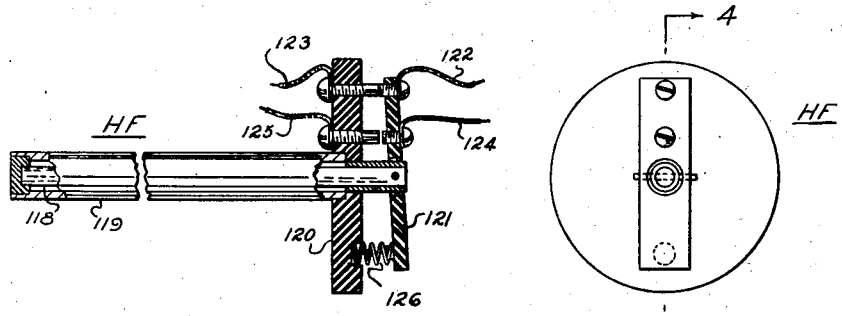
Fig. 3 illustrates a thermostatic relay.
Fig. 4 is a partial-section, in the direction of the arrows, along the lines 4—4 of Fig. 3.

Referring now to Fig. 1, I show an arrangement wherein I actually measure the vapor outflow through the pipe 244 to a turbine or other utilizer. To this end, I provide a flow meter 78 connected to the pipe 244 across an orifice or other restriction 79. The flow meter is adapted to vertically position a pilot stem 42 relative to a pilot casing 43 to vary an air loading pressure effective upon the relay 47 proportional to the rate of vapor outflow.

The Bourdon tube 22 positioned responsive to variations in vapor outflow temperature, is adapted to vertically position a pilot stem 80 for varying an air loading pressure through the connection 81 upon a pneumatic actuator 82 for positioning a set of dampers 83. The dampers 83 are preferably so located relative to the fluid path through the vapor generator as to control the relative heating of different portions of the fluid path, and thus control the vapor outflow temperature.

In Fig. 2 I illustrate the wiring circuit, particularly in connection with the arrangement of Fig. 1. The relative location and arrangement of the mechanical pieces of apparatus is the same on the two figures. For example, the Bourdon tubes 19 and 22, as well as the level indicator 29, the valve 10, the valve 17, the pipe 5, and the shaft of the auxiliary turbine are at the same relative locations on Fig. 2 as on Fig. 1.

What may be termed a master switch is shown at X and a second switch at Y. In connection with the pressure responsive Bourdon tube 19 I provide a high pressure trip HP and in connection with the temperature sensitive Bourdon tube 22 I provide a high temperature trip HT. In connection with the level responsive device 29 a low level trip LL is provided and for each of the five tubes leading into the separator drum 232 there is a double contact switch HF actuated upon abnormal temperature within the particular tube with which it is connected. A signal light O is provided with each of the trips HF which lights upon the occurrence of abnormal temperature. At LO is a pressure responsive trip actuated to open two circuits upon abnormal low lubricating oil pressure of the auxiliary turbine shaft. At LW is a switch actuated to open two circuits upon abnormally low water pressure at the inlet to the valve 17.

At S I indicate a spark plug or similar device located adjacent the gas burner 8 (Fig. 1) for kindling the fire.

Assuming the unit is not operating and it is desired to start the same, the lighting cycle is as follows: If water pressure is available at LW and lubricating oil available at LO, then closing the switch X starts the ignition spark at S, opens the gas valve 10 through energization of the solenoid K and energizes relays B, C and F. C shorts the coil of B to the ground, causing B to drop out, after four seconds and energize E which then opens the fuel-oil valve J in the pipe 5, closes oil by-pass valve M, and opens the coil circuit of F. After four seconds F drops out, energizing A (if the flame is established so that the flame failure device U has energized G). The energizing of A cuts off the ignition and energizes D which shuts off the valve 10, drops out C and closes another circuit to the coil of E. When C drops out, E is energized so that the by-pass of D (to the coil of E) is opened.

A failure of flame at the burner 4 causes G to drop out, deenergizing A which starts the ignition, and D which turns on the valve 10, energizes C, and drops out E. As E drops out, the fuel oil valve J is closed, M is opened, and F energized. The cycle continues as outlined above following the closing of switch X.

If HT, HP, or HF trip out, then E is dropped out closing J, opening M, and energizing F. Then the above mentioned flame failure cycle is followed except that the ignition and gas valve 10 are kept on and E cannot pick up until the particular trip (HF or HP or HT) is closed, due to correcting of the out-of-limit condition.

There is a current flow through the heating element of T whenever C and E are energized, which condition exists when the fuel oil is on and the flame failure detector U has not energized relay G. Thus if the flame is not established at the burner 4 within ten seconds after E is energized, T trips, shutting off S, K, and J. P will also trip after about five consecutive relighting cycles.

In the event of low water pressure to the inlet of the feed pump at LW, or low lubricating oil pressure at LO to the auxiliary set, the ignition S, valve K, and valve J, are shut off by LW or LO.

In addition these trips deenergize the solenoid P, which in turn trips the auxiliary turbine valve operator thus stopping the auxiliary set. The solenoid P normally holds the valve 117 (which is located in the air line 68) in a condition for free passage of air control pressure from 41 to 40. When P is deenergized, the valve 117 closes off connection with the stabilizing relay 41 and opens the diaphragm chamber of the actuator 40 to atmosphere, thus allowing the spring loading of such actuator to position the actuator to its closed position. This trips the auxiliary turbine off.

By the switch X the complete system may be shut down. By the switch Y the auxiliary turbine itself may be tripped out.

A solenoid actuated valve L is located in the air supply line leading to the pilot valve of the pressure sensitive Bourdon tube 19. Referring to the wiring diagram of Fig. 2, it will be observed that L is normally energized holding its valve open. When any of the safety switches trip out and open the electrical circuit to L, the valve closes, thus shutting off the supply of air to the pilot and releasing air pressure from the air pressure pipe 70. The spring loaded valve 18 in the by-pass line around the water pump then closes, as does the damper 15 at the inlet to the air blower.

Such operation is particularly desirable upon excessive temperature actuating any of the switches HF, for such trip-out will close the fuel valve J, and it is desirable that the air damper 15 be closed at the same time. The auxiliary set may continue to operate, thus driving the air blower and the only way that air flow to the furnace can be decreased is by shutting off the damper 15. At the same time it is desirable to close the by-pass valve 18 to insure that all of the water being pumped by the water pump goes to the vapor generator to protect against burning out the tubes, and to prevent overspeeding of the pump 289. It is to be understood that by closing the damper 15 I mean that it is to be closed to a predetermined minimum, which may be for example 20% of opening. It is desirable to have the damper go to a minimum opening position when flame fails because the recycling ignition control tends to immediately relight the burner and the blower may still be operating at a high rating.

The solenoid actuated valve L might equally as well be inserted in the air pressure line 70, in which case when deenergized the valve would close off from the pilot 69 and open, to the atmosphere, the diaphragm actuator 18 and the actuator 38.

At L' of Fig. 1, I indicate a solenoid actuated valve in the air supply line to the pilot 72 of the fuel-air ratio control. This valve is similar in function to the valve L and in the wiring diagram of Fig. 2 may replace, in the electrical circuit, the valve L. It may be connected in parallel with the valve L in the wiring circuit if both valve L and L' are used. It is effective in closing the fuel supply valve 13.

Referring to Fig. 1, the secondary control of fuel supply is by the regulating valve 13 from fuel-air ratio. If air flow varies, the fuel supply varies proportionately. I have provided a solenoid operated valve M in a by-pass around the fuel pump 290, regulating valve 13, and meter 14. This solenoid is electrically in parallel with the solenoid of valve J, so that when J is tripped out and closes the by-pass, valve M automatically opens, thus by-passing oil during that part of the lighting cycle when the main solenoid valve J is closed. If flame fails the valve J closes, which shuts off the supply of fuel to the burner. If I did not provide the by-pass and valve M there would then be a tendency for the meter 14 to decrease to zero and the fuel-air ratio would open the regulating valve 13 wide. If then the recycling opened the valve J there would be a wide open valve 13 which would immediately send a heavy volume of oil through J to the burner far in excess of what was desired. By providing the by-pass and valve M, then when the fire goes out and J is closed, the valve M opens and the flow through the meter 14 is maintained approximately as it was before in ratio with the air but the oil is now by-passing back through the valve M. The valve 13 does not open excessively or materially further than it was before and thus the flow available at J when J next opens is not excessive.

Referring particularly to Fig. 1, it is sometimes desirable to maintain the level within the separator 232 variable (directly or inversely) with rating. This may be accomplished through relative adjustment of the range and sensitivity of the control from the steam outflow meter 78 (representative of rating) and of the level recorder 29. Such adjustment will allow of control tending to maintain the level within the separator at a predetermined value, or at a level increasing with rating or at a level decreasing with rating in desired manner.

At Figs. 3 and 4 I show an assembly of a temperature switch HF. In preferred construction a quartz rod 118 and its encasing metal tube 119 are located in or adjacent to one of the tubes as, for example, 206 just before it enters the separator 232. The encasing tube 119 is fastened in an insulating member 120, while the quartz rod 118 is slidable therethrough. A second insulating member 121 is pivotally fastened to the quartz rod and is spring urged away from the member 120.

When subjected to a temperature below a predetermined high value, the relative location of parts is as shown in Fig. 4 wherein contact is closed between wires 122 and 123 and opened between wires 124 and 125. As temperature increases the metallic tube 119 elongates to the left from the member 120, carrying with it the quartz rod 118 which has relatively no variation in length with temperature. Such motion of the quartz rod to the left moves the member 121 around the contact 122, 123 as a pivot and against the compression of the spring 126 until at a certain degree of motion the contacts 124, 125 are closed, thus lighting the signal light O. If further increase in temperature occurs, then at a predetermined temperature further expansion of the tube 119 causes the member 121 to pivot around the contact 124, 125 open-circuiting the contacts 122, 123 and tripping off the unit.

Figures 5, 6:
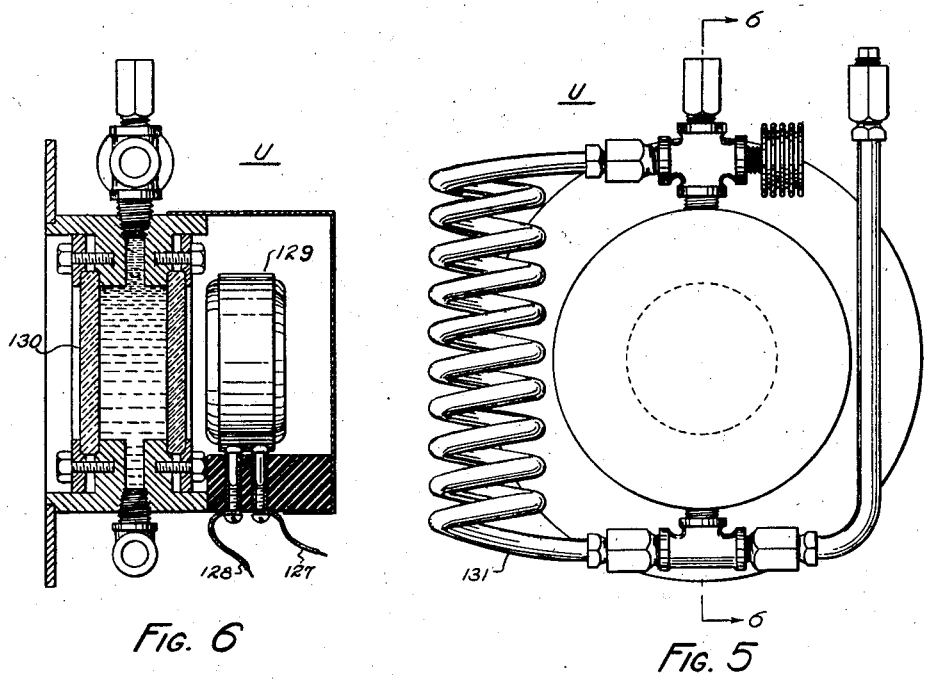
Fig. 5 is an elevation of a flame responsive device.
Fig. 6 is a sectional elevation of Fig. 5 along the line 6—6 in the direction of the arrows.

At Figs. 5 and 6 I illustrate a preferred construction of the device U, which I term a flame failure detector. A photronic cell 129 is located to look at the flame from the burner 4 and generates a current in the wires 127, 128 effective to energize the relay G when flame is present in the furnace. Between the photronic cell 129 and the flame is located a water cell or screen 130 provided with a thermal circulation system 131.

Certain features of the wiring diagram, ignition and flame failure circuits, temperature switch HF, and flame failure detector U, are disclosed and claimed in the co-pending application of Jack F. Shannon, Serial No. 55,028, filed December 18, 1935.

While I have chosen to illustrate and describe certain preferred embodiments of my invention, it is to be understood that this is by way of illustration only and that I am not to be limited thereby except as to the claims in view of prior art.

What I claim as new, and desire to secure by Letters Patent of the United States, is:

1. A kindling and igniting control system for a vapor generator receiving a fluid in the liquid state and delivering the fluid in a vapor state, said control system comprising means responsive to the value of a variable condition of the fluid adapted to close off the fuel supply when said variable condition reaches a predetermined value, normally inoperative kindling and igniting means for the fuel supply, means for rendering said fuel kindling and igniting means operative when said condition reaches said predetermined value, means for maintaining said kindling and igniting means operative for a predetermined time duration after said condition reaches said predetermined value and rendering said kindling and igniting means inoperative if said condition continues at said predetermined value thereafter, means for reestablishing the fuel supply and rendering operative said kindling and igniting means when said variable condition falls below said predetermined value, and means rendering said kindling and igniting means inoperative after ignition of the fuel.

2. A kindling and igniting control system for a vapor generator receiving a fluid in the liquid state and delivering the fluid in a vapor state, said control system comprising in combination therewith of, means responsive to the value of a variable condition of the fluid adapted to close off the fuel supply when said variable condition reaches a predetermined value, normally inoperative kindling and igniting means for the fuel supply, means for rendering said fuel kindling and igniting means operative when said condition reaches said predetermined value, means for maintaining said kindling and igniting means operative for a predetermined time duration after said condition reaches said predetermined value and rendering said kindling and igniting means inoperative if said condition continues at said predetermined value thereafter, means for reestablishing said fuel after said variable condition has fallen below said predetermined value and said kindling and igniting means has been operating a predetermined length of time, and means rendering said kindling and igniting means inoperative after ignition of the fuel.

3. A kindling and igniting control system for a vapor generator receiving a fluid in the liquid state and delivering the fluid in a vapor state, said control system comprising means responsive to the value of a variable condition of the fluid adapted to close off the fuel supply when said condition reaches a predetermined value, normally inoperative kindling and igniting means for the fuel supply, means for rendering said fuel kindling and igniting means operative when said condition reaches said predetermined value, means for maintaining said kindling and igniting means operative for a predetermined time duration after said condition reaches said predetermined value and rendering said kindling and igniting means inoperative if said condition continues at said predetermined value thereafter, means for reestablishing said fuel supply after said variable condition has fallen below said predetermined value, and means for closing off said fuel supply if said fuel fails to ignite.

4. A kindling and igniting control system for a vapor generator heated by products of combustion, said control system comprising, means responsive to a variable in the operation of said vapor generator controlling the supply of the elements of combustion thereto, igniting means for said elements of combustion and kindling means for said igniting means rendered operative upon said variable reaching a predetermined value, and current generating means responsive to the light of a flame established by said elements of combustion, the current generated by said light responsive means energizing a relay circuit and thus rendering said igniting and kindling means inoperative.

5. A kindling and igniting control system for a vapor generator heated by products of combustion, said control system comprising, means responsive to a variable in the operation of the vapor generator controlling the supply of the elements of combustion thereto, kindling means and igniting means for said elements of combustion rendered operative upon said variable condition reaching a predetermined value, means for maintaining said kindling and igniting means operative a predetermined time interval during the existence of said predetermined value of said variable condition, and current generating means sensitive to the light of a flame established by said elements of combustion, the current generated by said light responsive means energizing a relay circuit and thus rendering said igniting and kindling means inoperative.

PAUL S. DICKEY.